United States Patent [19]
Klein et al.

[11] 3,832,709
[45] Aug. 27, 1974

[54] MOTION DETECTION APPARATUS HAVING THE ABILITY TO DETERMINE THE DIRECTION OF MOTION AND RANGE OF A MOVING OBJECT

[75] Inventors: Carl F. Klein; James R. Bailey, both of Milwaukee, Wis.

[73] Assignee: Johnson Service Company, Milwaukee, Wis.

[22] Filed: Dec. 26, 1972

[21] Appl. No.: 318,001

[52] U.S. Cl. .................... 343/5 PD, 343/7.7, 343/9, 343/14
[51] Int. Cl. .............................................. G01s 9/42
[58] Field of Search ............... 343/5 PD, 7.7, 8, 14

[56] References Cited
UNITED STATES PATENTS

| | | | |
|---|---|---|---|
| 3,168,735 | 2/1965 | Cartwright | 343/14 X |
| 3,750,171 | 7/1973 | Faris | 343/14 X |
| 3,750,172 | 7/1973 | Tresselt | 343/14 X |
| 3,766,554 | 10/1973 | Tresselt | 343/14 |

*Primary Examiner*—T. H. Tubbesing
*Attorney, Agent, or Firm*—Johnson, Dienner, Emrich, Verbeck & Wagner

[57] ABSTRACT

A motion dectection system operable to detect the range and direction of motion of a moving object includes Doppler radar apparatus having single oscillator-mixer circuit operable as a transmitter to generate microwave signals alternately at first and second frequencies for radiation into an area being monitored such that whenever the transmitted signals at the two frequencies are reflected off a moving object, two distinct Doppler signals are produced, and as a receiver to detect the reflected Doppler signals; one of the Doppler signals phase leads or phase lags the other Doppler signal as a function of the direction of movement of the object with the magnitude of the phase difference indicating the range of the object, and the Doppler radar apparatus includes circuitry for processing the Doppler signals to determine the phase relationship between the received Doppler signals.

35 Claims, 10 Drawing Figures

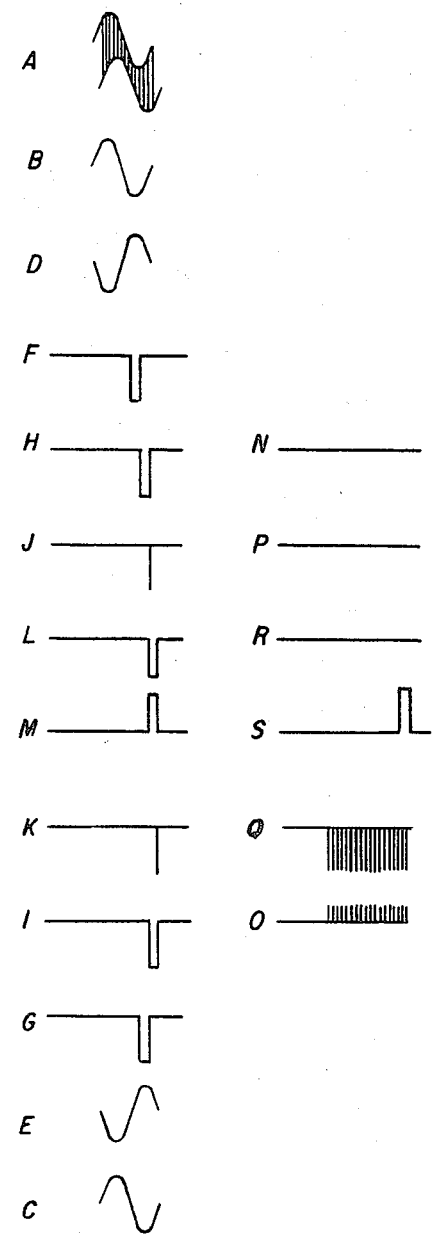
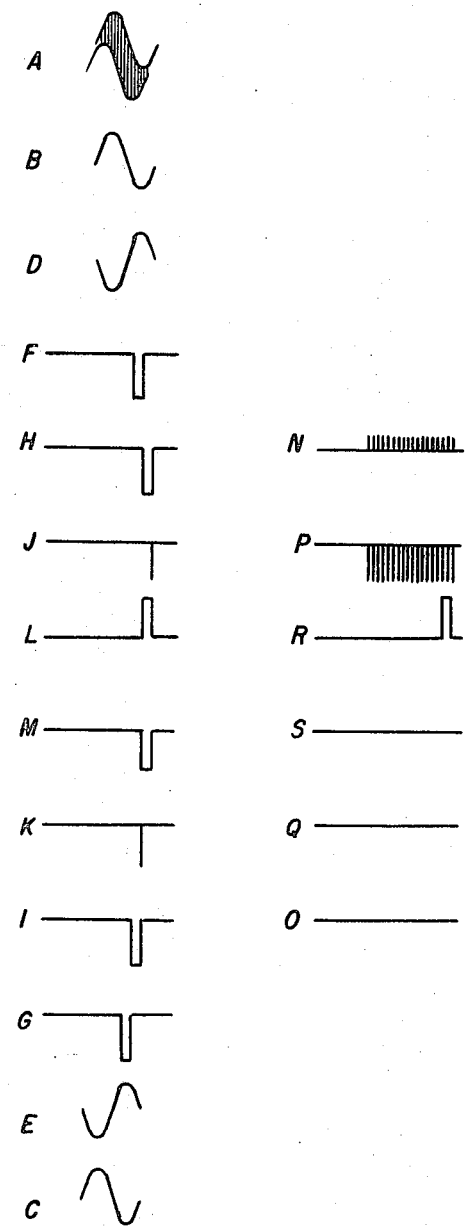
TIMING DIAGRAMS

MOTION DETECTION APPARATUS HAVING THE ABILITY TO DETERMINE THE DIRECTION OF MOTION AND RANGE OF A MOVING OBJECT

BACKGROUND OF THE INVENTION

1. Field of the Invention. This invention relates to motion detection systems, and more particularly, to apparatus for detemining the direction of motion and the range of a moving target.

2. Description of the Prior Art. The majority of radiant energy motion detection systems can be classified as either disturbed field or Doppler effect type systems. In the disturbed field type system, electromagnetic energy, radiated into an area being monitored, establishes an electromagnetic field within the monitored area. Any variation in the field strength is indicative of the presence of a moving body within the monitored area. Such variations in the electromagnetic field strength can easily be detected by a receiver which responsively provides an indication of movement within such area.

In Doppler effect type systems, electromagnetic energy at a known continuous frequency is generated by a transmitter and radiated into an area being monitored. In accordance with the Doppler effect, when portions of the electromagnetic waves radiated into the monitored area are reflected off moving objects within the monitored area, such portions of the electromagnetic energy will be shifted in frequency producing Doppler signals having frequencies related to characteristics of the moving object. A receiver associated with the transmitter receives reflected signals, which may include signals at the transmitted frequency and Doppler frequency signals, and compares the reflected signals with signals at the transmitted frequency. Any deviation in the frequency of reflected signals from that of the transmitted signal indicates motion within the area being monitored.

In one application, Doppler effect type motion detection systems are used in intrusion alarm systems for detecting the presence of an intruder within a protected area. The Doppler frequency signals produced as the result of electromagnetic waves being reflected off an intruder moving within the effective radiation field of the system are thus indicative of movement of an unauthorized intruder.

FOr example, one motion detection system employing the Doppler radar effect is disclosed in the U.S. application Ser. No. 239,104, of Geoffrey Allen Young, which was filed Mar. 29, 1972 and which is entitled Intrusion Detection System Including a Noise Inhibit Circuit. The system of the referenced application comprises Doppler radar apparatus including a transmitter which generates ultrasonic or electromagnetic energy for radiation into an area to be protected. Such portions of the radiated energy which are reflected off a moving target, such as a human intruder, moving within the protected area will be shifted in frequency, producing Doppler frequency signals indicative of movement of the intruder within the secured area. Such Doppler shifted signals along with signals at the transmitted frequency are reflected back to the Doppler apparatus which further includes a receiver which is operable to recover the Doppler frequency signals and provide an output indicative of the detection of movement of an intruder within the protected area.

Another intrusion detection system employing the Doppler frequency effect is disclosed in the U.S. Pat. No. 3,750,165 of Carl Klein, James R. Bailey, Lawrence B. Korta and Donald F. Pridemore, which issued on July 31, 1973 and is entitled "Intrusion Detection Apparatus Having a High Frequency Diode Oscillator-Mixer Element." More fully disclosed in this further referenced application, is an intrusion detection system which comprises a single diode device and an associated antenna which are used for both transmitting and receiving electromagnetic energy. THe system employs an avalanche or Gunn diode oscillator-mixer, operating above four GHz, which is mounted within an open ended coaxial line cavity. The microwave oscillator diode is therefore exposed to both transmitted and received signals. Since the diode has a non-liner characteristic, the diode inherently performs the required mixing function for separating the Doppler frequency signals from the signals at the transmitted frequency to recover the Doppler frequency signals.

Alternatively, in U.S. Pat. No. 3,668,703 of Carl F. Klein, issued June 6, 1972, entitled "Motion Detector," a transistor is employed in the transmission and reception of RF energy into a protected area. The reception of energy reflected off objects within the protected area coupled with the nonlinear characteristic of the transistor enables the transistor to provide mixing of the transmitted and reflected signals. Accordingly, a single semiconductor device can be used not only as an RF signal source but also as a mixer to recover the Doppler frequency signals from signals at the transmitted frequency.

The motion detection systems referenced above, as well as other known motion detection systems employing the Doppler effect, are capable of producing Doppler frequency signals indicative of the presence of a moving object within the effective radiation field of the systems. However, such prior art systems cannot distingush the phase polarity of the Doppler signals, and accordingly, cannot determine the direction of movement of the object relative to the transmitter-receiver apparatus.

In U.S. Pat. No. 3,659,293 which was issued on Apr. 25, 1972 to Radha Raman Gupta, there is disclosed a range detecting Doppler radar system wherein a single solid state device is used for generating microwave energy at time-shared first and second frequencies for transmission toward a target, and for simultaneously mixing microwave energy reflected from a target with generated energy at each of the transmitted frequencies to obtain a composite Doppler signal having two time-shared components. The composite Doppler signals are then separated into respective components and extrapolated to provide two continuous signals. A phase comparator is responsive to the resultant signal pair to provide a signal representative of the phase difference between the two extra-polated components which is representative of range to the target.

However, the radar system disclosed in U.S. Pat. No. 3,659,293 does not provide information indicating the direction of motion of the target relative to the Doppler radar apparatus. Such information is desirable in many applications, and particularly in intrusion detection systems wherein noise motion caused by vibrating or fluttering stationary objects within the effective radiation field of the system could cause an alarm indication to be provided, resulting in numerous false alarms.

SUMMARY OF THE INVENTION

The present invention provides an improved motion detection system including Dopplar radar apparatus which is operable to determine not only the existence of a moving object within an area being monitored by the system, but also the range and the direction of movement of the object relative to the Doppler radar apparatus.

The Doppler radar apparatus generates frequency signals for radiation into the area being monitored. Whenever the frequency signals are reflected off objects moving within the effective radiation field of the system, the signals will be shifted in frequency producing Doppler frequency signals which are related in frequency to characteristics of the moving object.

As an object moves toward or away from the location of the Doppler radar apparatus, the Doppler signals produced as the result of such movement will be shited in phase from one another with the polarity of the phase shift indicating the direction of movement of the object relative to the location of the Dopplar radar apparatus and the magnitude of the phase shift indicating the range of the object relative to the Doppler radar apparatus.

The motion detection system further includes Doppler signal processing apparatus operable to determine the magnitude and polarity of the phase shift between successive Doppler signals to provide information relating to the movements of the object within the area being monitored by the system.

Thus, an important feature of the motion detection system provided by the present invention is the capability of distinguishing a single moving object among a multitude of vibrating or fluttering stationary objects, and correctly indicating whether the moving object is approaching or receding from the location of the Doppler radar apparatus.

The motion detection system of the present invention is described with reference to an application in an intrusion alarm system for detecting movement of an unauthorized intruder within an area protected by the system and providing an alarm indication in response to the detection of unauthorized intrusions. In such application, the improved motion detection system provided by the present invention is capable of distinguishing between Doppler signals produced as the result of human motion and Doppler signals produced as the result of noise motion which may be caused, for example, by wall vibrations or machinery operating within the protected area. Since noise motion is repetitive, the Doppler signals produced as the result of such noise motion will be ineffective to cause an alarm indication to be provided. Therefore, in the motion detection system of the present invention, intruder detection capabilities are determined not only by the detection of Doppler signals as in most conventional Doppler effect intrusion alarms, but also by the relative phases of successive Doppler signals. Accordingly, the present invention has provided an intrusion alarm system which is substantially unresponsive to noise motions which could cause false alarms, and thus has a greatly increased reliability.

Moreover, the motion detection system of the present invention performs the above-noted functions in a new and greatly improved manner through the utilization of common transmitter-receiver apparatus, including a diode device, for both the generation of frequency signals for radiation into an area to be protected and for the reception of Doppler frequency signals. The use of a single diode device to perform both the transmitting and the receiving functions results in an intrusion detector system that is characterized by increased mixer efficiency and greater system simplicity and reliability.

In accordance with one embodiment for the motion detection system, this improved performance is provided through the use of Doppler radar apparatus which is operable to generate microwave signals alternately at first and second frequencies for radiation into an area to be protected. The two microwave signals are distinct but closely spaced in frequency, and the signals at each of the two frequencies when reflected off moving objects within the protected area will produce distinct Doppler signals which are individually detectable.

The Doppler radar apparatus comprises a diode oscillator-mixer circuit which is operable as a transmitter on a time-shared basis to generate microwave signals at first and second frequencies for radiation into the area to be protected. In addition, the oscillator-mixer serves as a receiver to receive reflected signals, including signals at the transmitted frequencies and Doppler frequency signals. Thus, the diode of the oscillator-mixer circuit is exposed to both transmitted and received signals, and the non-linear characteristic of the diode enables the diode to perform the required mixing function to permit the Doppler frequency signals to be recovered from the reflected signals.

The oscillator-mixer produces the sum and difference frequencies of the transmitted and reflected signals, and after appropriate filtering, the Doppler signals at first and second frequencies are produced as the result of reflections of transmitted signals of first and second frequencies.

Provided a given difference in frequency exists between the two transmitted signals, the phase difference between the first and second Doppler signals, produced as the result of reflection of moving objects within the protected area, is linearly dependent upon the distance between the moving object and the Doppler radar apparatus. Moreover, the direction of motion of the moving object determines which of the two recovered Doppler signals will lead or lag the other Doppler signal in phase.

Thus, for example, if an object within the effective radiation field of the system is moving in a direction away from the signal transmitter, the time required for a transmitted signal at the first frequency to reach the object and be reflected back to the receiver will be shorter than the time required for a transmitted signal at the second frequency to reach the object and be reflected back to the receiver. Accordingly, the first Doppler signal produced as the result of reflection of the transmitted signal at the first frequency will phase-lead the second Doppler signal produced as the result of reflection of the transmitted signal at the second frequency. Conversely, if the object were moving toward the transmitter-receiver apparatus, the first Doppler signal would phase-lag the second Doppler signal. Within a given range interval the Doppler signals are almost identical except for a phase shift of one with respect to the other.

The first and second Doppler frequency signals provided at the output of the oscillator mixer are extended to a synchronous chopper gate circuit which separates the two Doppler frequency signals corresponding to the two transmitter states. The output of the Doppler signal separation circuit thus consists of two individual Doppler signals related in phase to the range and direction of an object moving within the effective range of the system. The Doppler signals are then amplified and applied to amplitude detectors which pass only signals in excess of a predetermined amplitude.

The outputs of the amplitude detectors are applied to pulse shaping networks which in turn drive a phase detection circuit embodied as a JK flip flop. The magnitude and polarity of the phase difference between the two Doppler signals determine the ratio of the "set" to "reset" time for the flip flop. Accordingly, the duration of the signals provided at the positive and negative outputs of the flip flop will vary in correspondence with the phase relationship between the two Doppler signals. A difference in phase produces an unbalanced output signal (that is, unequal pulse widths for the signals provided at the positive and negative outputs of the phase detect flip flop). The magnitude of the unbalance indicates the distance between the object and the transmitter-receiver of the Doppler radar apparatus, and the polarity of the unbalance indicates the direction in which the object is moving relative to the transmitter-receiver.

The outputs of the phase detect flip flop are fed to separate pulse width detector circuits one or the other of which provides a pulse output which is proportional to the difference in phase between the two Doppler frequency signals and correspondingly, proportional to the linear distance to the moving object. Either of the two pulse width detector circuits may be enabled, depending upon the polarity of the phase difference and thus the direction in which the object is moving relative to the Doppler radar apparatus.

The pulse width detectors each drive suitable alarm indicating means to provide a first indication for a phase lead of the first Doppler signal relative to the second Doppler signal, and a second indication for a phase lag of the first Doppler signal relative to the second Doppler signal.

Other objects and features, as well as further advantages of the motion detection system provided by the present invention will become apparent from the following detailed description which makes reference to the following drawings.

BRIEF DESCRIPTION OF THE DRAWINGS

FIG. 4 is a schematic circuit representation of a second embodiment for a transmitter receiver apparatus for use in a circuit shown in FIG. 2; and FIGS. 5 and 5a are timing diagrams showing the waveforms of signals provided at various points in the schematic circuit diagram of FIGS. 2 and 3.

DESCRIPTION OF PREFERRED EMBODIMENTS

General Description

Figure 1:
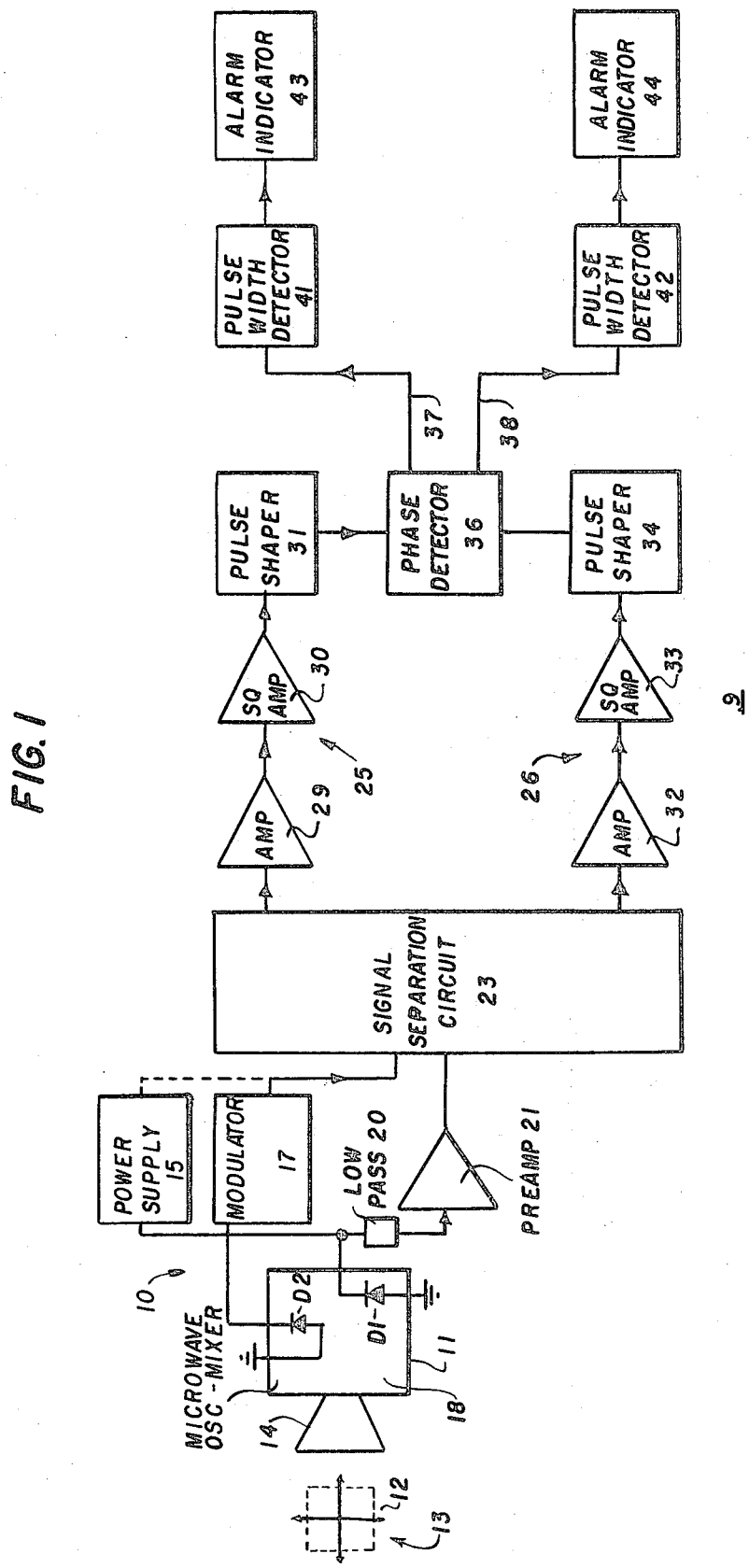
FIG. 1 is a block diagram of a motion detection system provided in accordance with the present invention.

Referring to FIG. 1 there is shown a block diagram of one embodiment for a motion detection system 9 provided by the present invention. In an exemplary embodiment, the motion detection system 9 is described with reference to an application in an intrusion alarm system for detecting unauthorized movement of an intruder within an area protected by the system.

The intrusion alarm system 9 includes Doppler radar apparatus 10 including an oscillator-mixer circuit 11 which is operable as both a transmitter for generating frequency signals for radiation into the area to be protected and as a receiver for receiving Doppler motion signals produced whenever the frequency signals are reflected off a moving body indicated generally at 12, such as a human intruder moving within the protected area, indicated generally at 13.

The oscillator-mixer 11 includes an avalanche diode D1 and an associated antenna structure 14. The avalanche diode D1 is biased for operation by current supplied by a power supply circuit 15. The oscillator-mixer 11 is operable on a time-shared basis to generate signals at first and second frequencies, F1 and F2, respectively. The frequency of oscillation of the diode D1 may be controlled by a modulator circuit 17 which includes a voltage variable capacitance device, such as a varactor diode D2, which is located within the oscillator cavity 18. Alternatively, the frequency of oscillation of the avalanche diode D1 may be modulated by varying the current supplied to the diode D1 from the power supply circuit 15. Thus, the oscillator 11 generates signals alternately at frequencies F1 and F2 and the frequency signals thus generated are radiated into the protected area 13.

Whenever an unauthorized intruder 12 is moving within the protected area 13, the portions of the radiated energy which are reflected by the intruder will be shifted in frequency producing distinct Doppler signals for each of the transmitted frequencies F1 and F2, which Doppler signals are reflected back to the location of the Doppler radar apparatus 10. Moreover, within a given range interval, the Doppler signals, produced whenever the transmitted signals of frequencies F1 and F2 are reflected off an intruder moving toward or away frm the location of the Doppler apparatus 10, are almost identical except for a phase shift of one with respect to the other. Provided a given difference in the frequencies of the transmitted signals F1 and F2 exists, the phase difference between the resulting Doppler motion signals is linearly dependent upon the distance between the intruder 12 and the Doppler radar apparatus 10.

In addition, the Doppler signals resulting from reflection by the intruder of transmitted signals at frequency F1 will either phase lead or phase lag the Doppler signals resulting from reflection by the intruder of transmitted signals at frequency F2, as a function of the direction of movement of the intruder relative to the Doppler apparatus 10.

As noted above, a single oscillator-mixer circuit 11, comprised of avalanche diode D1, is used both to generate the two transmitted frequencies F1 and F2 and to perform the required mixing function between transmitted and received signals.

In addition, the signal transmission time of the oscillator 11 in each of its transmitting states (i.e., F1, F2) as determined by the modulator circuit 17, is sufficiently long to permit the echo signal from frequency F1, for example, to be received while the oscillator is still emitting a signal at frequency F1. The avalanche diode D1 of the oscillator-mixer circuit 11 is thus exposed to both the transmitted and the received signals, and in view of the non-linear characteristic of the diode D1, the diode D1 can perform the required mixing function, mixing the reflected signals with signals at the transmitted frequency.

Accordingly, both the sum and the difference frequencies of the transmitted and reflected signals, along with higher order harmonic terms, are provided at the output of the oscillator-mixer 11. The output signals provided at the output of the oscillator-mixer 11 are passed over a low pass filter network 20 and a preamplifier 21 to a synchronous gating network 23. The preamplifier 21 provides amplification of the Doppler signals passed by the filter network 20.

The synchronous gating network 23 is operable to separate the two Doppler signals corresponding to the two transmitter frequency states F1 and F2. The output of the Doppler frequency separation circuit 23 thus consists of two individual Doppler signals, the phase relationship of which has been preserved.

The relative phase shift of one Doppler frequency signal (of phase $\phi d1$) with respect to the other Doppler frequency signal (of phase $\phi d2$) is given by the relationship:

$$\phi d1 - \phi d2 = 2(F2-F1)r/c$$

where F1 and F2 represent the frequencies of the two transmitted signals, r = the range of the moving object or intruder and c = the speed of light. From the relationship given above, it is apparent that for a given pair of transmitted signals, the phase difference between the two Doppler frequency signals is directly proportional to the range of the intruder relative to the Doppler radar apparatus.

The two Doppler signals are individually passed to separate Doppler frequency processing circuits or signal channels indicated generally at 25 and 26. For example, the Doppler signals produced by the first transmitted frequency F1 are passed to Doppler signal processing circuits 25 and the Doppler signals produced as a result of transmitted signals at frequency F2 are passed to Doppler signal processing circuits 26.

The Doppler signal processing circuits 25 include an amplifier circuit 29, a squaring amplifier circuit 30 and a pulse shaping circuit 31. Similarly, Doppler signal processing circuits 26 include an amplifier 32, a squaring amplifier 33 and a pulse shaping circuit 34.

The squaring amplifiers 30 and 33 serve as amplitude gates passing only signals in excess of a preselected amplitude. The pulse shaping circuits 31 and 34 are responsive to signals passed by the squaring amplifiers 30 and 33 to provide rectangular output pulses of uniform amplitude and rise times regardless of the amplitude and frequency of the Doppler frequency signals extended to the signal processing circuits 25 and 26. However, since the signal processing circuits 25 and 26 are operable independently of one another, whenever there is a phase difference between the two Doppler signals, an output pulse will be provided by one of the signal channels before an output pulse is provided by the other signal channel. The time delay between the pulses is indicative of the phase difference between the two Doppler signals which are separately extended to the two signal channels 25 and 26.

Thus, for example, assuming the Doppler signal extended to signal channel 25 phase lags the Doppler signal extended to signal channel 26, a pulse output will be provided by pulse shaping circuit 31 before a pulse output is provided by pulse shaping circuit 34. Such condition indicates that the intruder is moving away from the location of the Doppler radar apparatus 10. Moreover, the time lag between the provision of the pulse at the output of signal channel 25 and the pulse at the output of signal channel 26 is proportional to the distance between the intruder and the Doppler radar apparatus 10 and thus indicates the range of the intruder.

The pulse outputs of the pulse shaping circuits 31 and 34 control a phase detector circuit 36, which may be embodied as a JK flip flop. The phase detector flip flop 36 is responsive to the pulses provided over the two separate signal channels 25 and 26 to be alternately set and reset, with the output waveform of the flip flop being indicative of the phase relationship between the Doppler signals passed over the two signal channels 25 and 26.

Thus, in the case where the Doppler signal extended to signal channel 25 phase lags the Doppler signal extended to signal channel 26, the pulse output provided by pulse shaping circuit 31 will set the JK flip flop phase detector 36 which responsively provides a signal at the positive output 37 until the flip flop 36 is reset by a pulse output provided by pulse shaping circuit 34 at which time a signal will be provided at the negative output 38 of the flip flop 36. It is pointed out the flip flop 36 will again be set by a pulse output of the pulse shaping circuit 31 provided in response to a subsequent Doppler signal of a pair extended to signal channel 25 from the Doppler signal separation circuit 23.

The signals provided at the positive and negative outputs 37 and 38 of the phase detector flip flop 36 are passed to separate pulse width detector circuits 41 and 42, respectively. Each pulse width detector circuit, such as pulse width detector circuit 41, is controlled by the signals provided at outputs of the phase detector flip flop 36 to provide an output which is proportional to the duration of the output pulse provided at a respective output of the phase detector flip flop 36. Thus, pulse width detector 41 which is connected to the positive output 37 of the flip flop 36 will be enabled to provide an output which is proportional to the time duration for which the phase detector flip flop 36 is set, and pulse width detector 42 which is connected to the negative output 38 of the flip flop 36 will be enabled to provide an output which is proportional to the duration for which the phase detector flip flop 36 is reset.

Moreover, the pulse width detector circuits 41 and 42 are operable to determine the ratio of the "set" to "reset" condition of the phase detector flip flop 36. More specifically, the pulse width detector circuits 41 and 42 are interconnected such that the duration of the signal provided at the positive output 37 of the flip flop 36 in response to a Doppler signal of a given pair of Doppler signals can be compared to the duration of the signal provided at the negative output 38 of the flip flop 36 respondive to the other Doppler signal of the pair. Whenever the pulse width ratio exceeds a predetermined value for a preselected number of successive pairs of Doppler signals, one of the pulse width detector circuits 41,42 will be enabled to provide an alarm output indicative of the direction of motion of the intruder. The alarm outputs provided by the pulse width detecting circuits 41 and 42 are used to control associated alarm indicating apparatus 43 and 44, respectively.

Thus, for example, if the intruder is moving away from the location of the Doppler radar apparatus 10, the Doppler signals coresponding to the F1 transmission state of the oscillator-mixer 11 will phase lag the Doppler signals corresponding to the F2 transmission state of the oscillator-mixer 11. Accordingly, depending upon the range of the intruder, the width of the pulse output provided at the positive output 37 of the flip flop 36 will exceed the width of the pulse output provided at the negative output 38 of the flip flop 36.

Accordingly, assuming the pulse width ratio exceeds the predetermined value for a number of successive pairs of Doppler signals, pulse width detector 41 will be enabled to provide an alarm output for controlling the associated alarm indicating apparatus 43 to provide an indication of a phase-lag condition for the Doppler signals corresponding to transmitter frequency state F1 relative to the Doppler signals corresponding to transmitter frequency state F2, and correspondingly indicating that the intruder is moving away from the location of the Doppler apparatus.

In a similar manner, a phase-lead condition of the Doppler signals corresponding to transmitter frequency state F1 relative to Doppler signals corresponding to transmitter frequency state F2 will cause pulse width detector 42 to be enabled to control the associated alarm indicator apparatus 44 to provide an indication that the intruder is moving toward the Doppler radar apparatus 10.

Detailed Description

Figure 2:
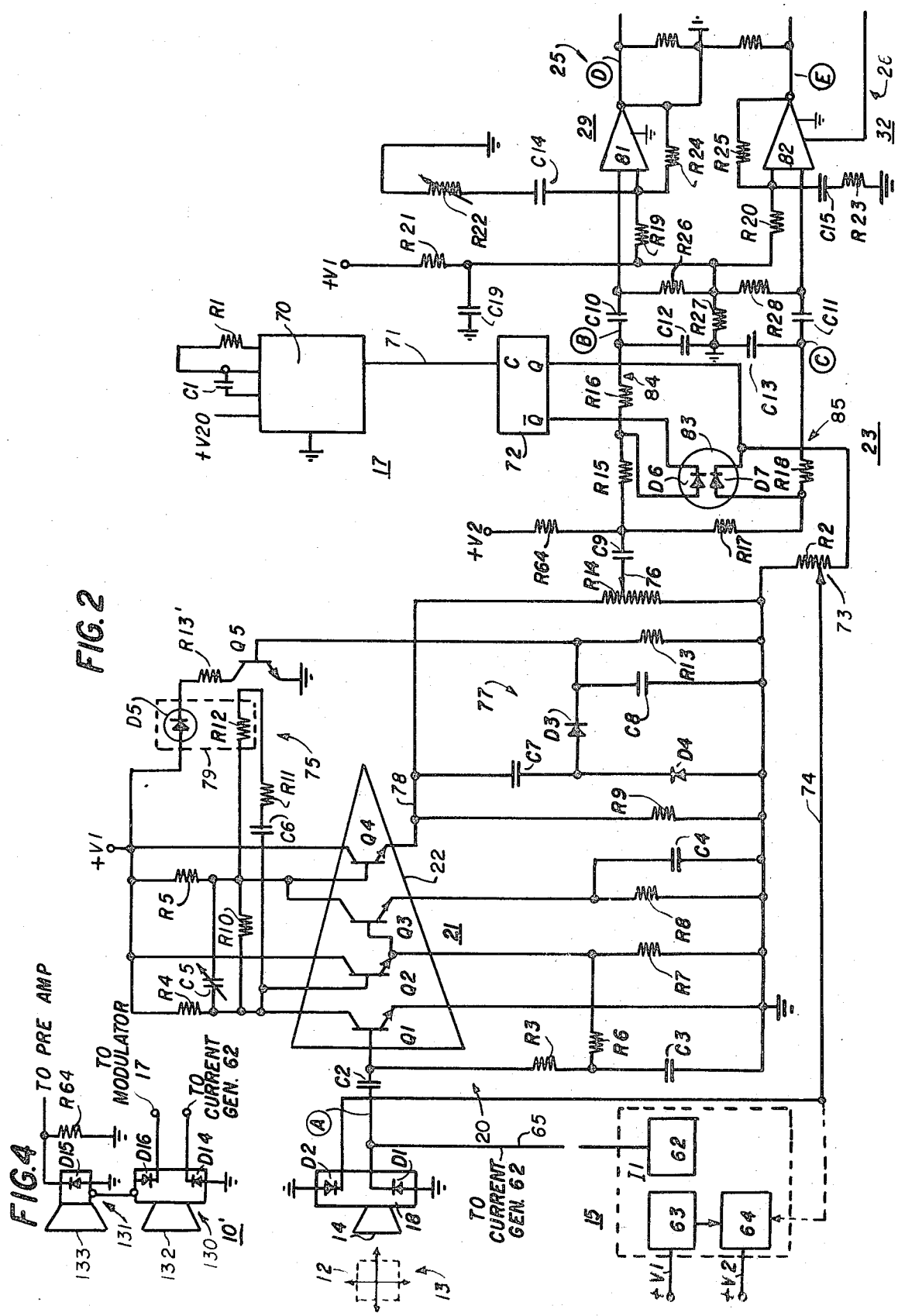
FIGS. 2 and 3, when assembled in side by side relationship, is a schematic circuit diagram of the motion detection system shown in FIG. 1.
Figure 3:
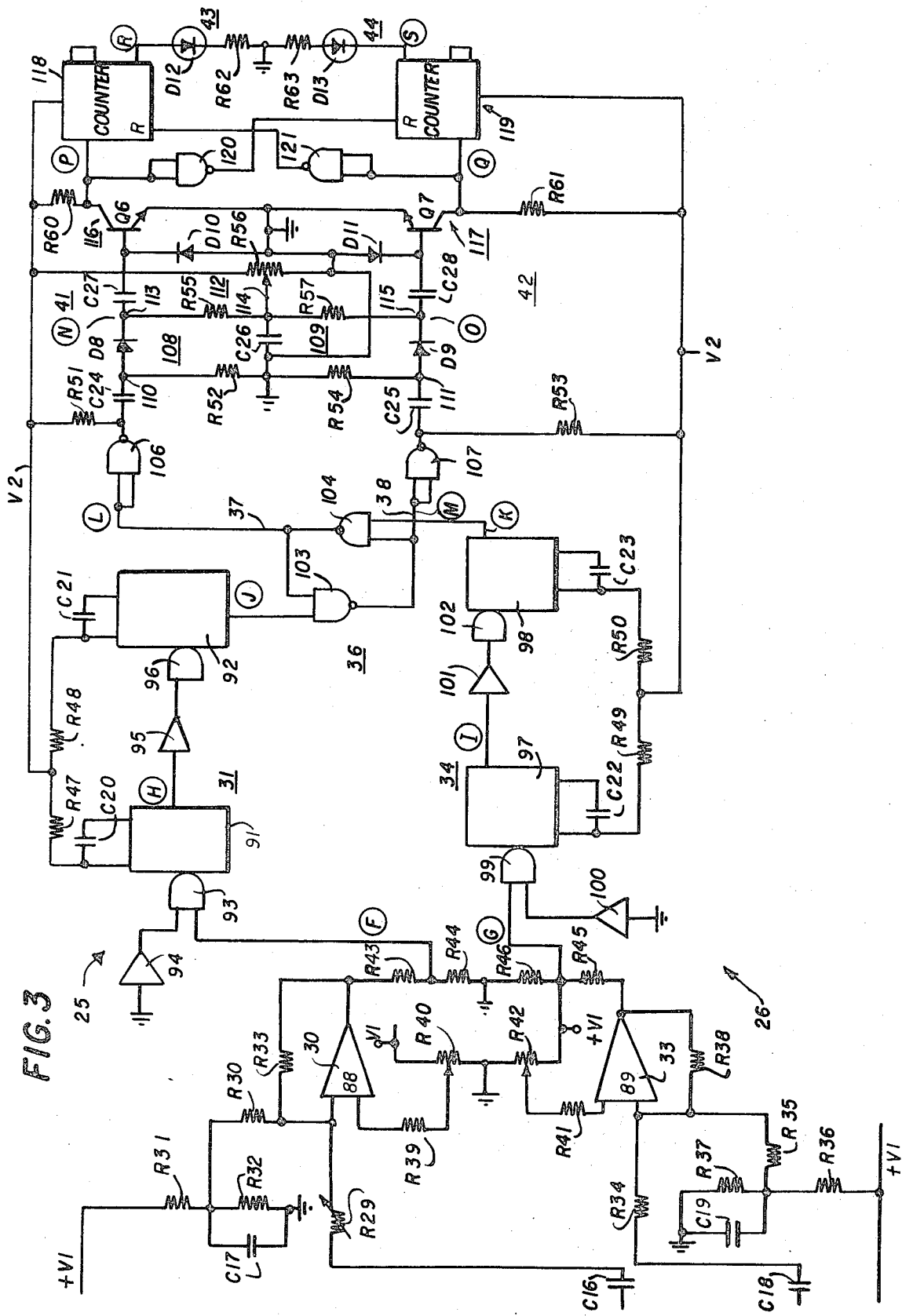

FIGS. 2 and 3, when arranged in a side-by-side relationship, show a detailed schematic circuit diagram of the intrusion detection system 9 described hereinabove with reference to the block diagram shown in FIG. 1.

Referring first to FIG. 2, the oscillator-mixer circuit 11 includes an avalanche diode D1, such as the type VAO-12B commercially available from Varian Associates. The avalanche diode D1 is biased for operation by current supplied to the diode D1 from a constant current source 62 of a power supply circuit 15. The power supply circuit 15 further includes a pair of voltage sources 63 and 64 which provide first and second voltages, V1 and V2, respectively, for the intrusion detection circuit 9.

The cathode of the avalanche diode D1 is connected over a conductor 65 to the output of the constant current generator 62. The anode of the avalanche diode D1 is connected to ground or a point of reference potential for the intrusion alarm system 9. The avalanche diode D1 is operable to oscillate at a preselected microwave frequency.

A varactor diode D2, such as the type DOH7C commercially available from Varian associates, located within the microwave oscillator cavity 18, is driven by a modulator circuit 17 effecting frequency modulation of the output of the microwave diode D1 whereby the oscillator-mixer circuit 11 generates microwave signals alternately at first and second frequencies F1 and F2, for radiation via an associated antenna 14 into the area to be protected.

The modulator circuit 17 is comprised of a clock pulse generating circuit 70, operable to provide clock pulses at a 50 KHz rate, and a clocking flip flop 72 which is driven by clock pulses provided by the clock pulse generator circuit 70.

The clock pulse generator circuit 70 may be embodied as a dual retriggerable monostable multivibrator, such as the type SN74123, commercially available from Texas Instruments, having associated frequency tuning elements, including a resistor R1 and a capacitor C1 for setting the frequency of the multivibrator 70.

The output 71 of the clock pulse generator 70 is extended to the clock input c of the clocking flip flop 72 which follows the clock pulse train providing complementary pulse trains at the positive and negative outputs Q and $\bar{Q}$, respectively of the clocking flip flop 72.

A potentiometer R2, connected between the positive output Q of the clocking flip flop 72 and ground, has a wiper 73 connected over a conductor 74 to the cathode of the varactor diode D2 which has an anode connected to ground. Accordingly, the modulator circuit 17 supplies bias to the varactor diode D2 at an 25 KHz rate for effecting frequency modulation of the output of the diode oscillator 11 to produce first and second transmitted frequencies, F1 and F2 for radiation into the area to be protected. Typical values for the two transmitted frequencies F1 and F2 are 10.525 GHz and 10.526 GHz, respectively.

As can be seen the two transmitted frequencies are closely spaced and yet distinct. Accordingly, whenever the signals at the two transmitted frequencies are reflected off a target, such as a human intruder, moving within the effective radiation field of the system, two distinct Doppler frequency signals will be produced. Moreover the two Doppler frequency signals will be almost identical except for a phase shift of one with respect to the other.

Thus, for example, if the intruder is moving away from the location of the Doppler radar apparatus 10, the Doppler frequency signals produced when signals at the transmitted frequency F1 as reflected off the intruder and radiated back to the receiver or oscillator-mixer 11, will phase lag the Doppler frequency signals produced when signals at the transmitted frequency F2 are reflected off the intruder.

The 25 KHz switching rate of the transmitter 11, as determined by the frequency of the modulator circuit 17, is sufficiently low as to permit the reflected Doppler signals corresponding to the transmitted frequency F1 to be received at the oscillator-mixer 11 while the frequency F1 is still being trnsmitted.

Accordingly, diode D1 of the oscillator-mixer 11 which is exposed simultaneously to both the transmitted and received signals performs the required mixing function, producing the sum and difference frequencies of the transmitted and received signals along with higher order harmonic terms.

A timing diagram, given in FIG. 5, shows the signal outputs A-S provided at corresponding points A-S of the circuit shown schematically in FIGS. 2 and 3. The waveform indicated at A in FIG. 5, which represents the output of the osciallator-mixer 11 at point A in FIG. 2, contains two Doppler frequency signals and the 25 KHz modulation signal. The timing diagram given in FIG. 5 represents a condition in which a Doppler frequency signal (waveform B, FIG. 5) corresponding to transmitted signal at frequency F1 phase leads a Doppler frequency signal (waveform C, FIG. 5) corresponding to the transmitted signal at frequency F2. The timing diagram given in FIG. 5a, represents a condition in which a Doppler frequency signal corresponding to the transmitted signal F2 phase leads a Doppler signal corresponding to the transmitted signal F1.

The signals provided at the output of the oscillator-mixer 11 at point A are extended over a low pass filter network 20, including capacitor C2 and resistor R3 to the input of a voltage preamplifier 21. The filter network 20 passes the Doppler frequencies to the preamplifier 21.

In an exemplary embodiment the preamplifier 21 comprises a transistor array 22 such as the type CA 3039 commercially available from RCA. The transistor array includes a plurality of transistors Q1–Q4, and associated bias and feedback resistors R4–R10 and capacitors C3–C4, which are connected in cascade as a voltage amplifier having several feedback loops whch stabilize the gain and improve the frequency response of the preamplifier 21. The preamplifier 21 further includes a capacitor C5 which rolls off the high frequency response of the preamplifier 21 to prevent high frequency regeneration and oscillation in the preamplifier 21.

The preamplifier 21 may also include an automatic gain controlling network 75, including a series circuit consisting of a capacitor C6, a resistor R11, and a photoresistor section R12 of a photon coupler 79, which is connected between the collectors of the first and third transistors Q1 and Q3 of the transistor array 22. The gain control network 75 is responsive to the rectified average value of an AC voltage provided over an output network 77 of the amplifier whenever Doppler signals are applied to the input of the preamplifier 21.

The preamplifier output network 77 includes capacitors C7, C8, diodes D3 and D4 and a resistor R13. Doppler frequency signals provided at the signal output 78 of the preamplifier are coupled over capacitor C7 and diode D3, which provides half wave rectification of the Doppler signals, and the rectified signals are impressed across resistor R13. Resistor R13 is connected between the base of a transistor Q5 of the gain control circuit 75 and ground. The collector of transistor Q5 is connected over a resistor R13' and a light emitting diode D5 of the photon coupler to the output of voltage source V1. The emitter of transistor Q5 is connected to ground.

Accordingly, the DC level provided across resistor R13 will control the conductivity of the transistor Q5, and correspondingly, the level of light emission of diode D5. Consequently, the resistance of resistor R12 of the photon coupler, and correspondingly the conductivity of the feedback path between the third and first stages of the voltage preamplifier 21 will be controlled by the rectified average value of the Doppler signals provided at the signal output 78 of the voltage preamplifier 21.

The Doppler signals passed through the preamplifier stage 21 are also impressed across a potentiometer R14 which is connected between the signal output 78 of the preamplifier 21 and ground. A portion of the signal provided at the output of the preamplifier stage 21 is extended via a wiper 76 of the potentiometer R14 and capacitor C9 to separate inputs of the Doppler signal separation circuit 23 which are operable to pass the Doppler frequency signals corresponding to the two transmitter states (i.e., frequencies F1 and F2) to two individual signal channels 25 and 26. One signal path can be traced from the wiper 76 of potentiometer R14 over capacitor C9, resistors R15 and R16 to point B and over a capacitor C10 to a first input of an amplifier circuit 29, embodied as an operational amplifier 81. A capacitor C12 is connected between the junction of resistor R16 and capacitor C10 and ground.

A second signal path can be traced from the wiper 76 of the potentiometer R14 over capacitor C9 and over resistors R17 and R18 to point C and over a capacitor C11 to a first input of a further operational amplifier circuit 82. A capacitor C13 is connected between the junction of resistor R18 and capacitor C11 and ground.

The Doppler signal separation circuit 23 further includes a synchronous chopper gate 83 embodied as a diode array, such as the type CA3039 chopper gates commercially available from RCA. The diode array 83 includes a pair of diodes D6 and D7. The anode of diode D6 is connected to the junction of resistors R15 and R16, in the Doppler frequency signal path from the potentiometer wiper 76 to the first input of operational amplifier 81, and the cathode of diode D6 is connected to the negative output $\bar{Q}$ of the clocking flip flop 72 of the modulator circuit 17.

Similarly, the anode of diode D7 is connected to the junction of resistors R17 and R18 in the Doppler frequency signal path from the potentiometer wiper 76 to the input of operational amplifier 82, and the cathode of diode D7 is connected to the positive output Q of the clocking flip flop 72.

The diodes D6 and D7 which comprise the synchronous chopper gates 83 are driven by the modulator circuit 17 at a 25 KHz rate to synchronously gate the amplified signal provided at the output of the preamplifier 21 to the inputs of the operational amplifiers 81 and 82.

The amplified signal is extended over capacitor C9 to the synchronous chopper gate circuit 83 where, on alternate half cycles of the 25 KHz modulation signal, either diode D6 or diode D7 will be rendered conductive, shunting the majority of the amplified signal through the conducting diode, such as diode D7, to ground through the flip flop 72. The other diode, such as diode D6, being non-conductive, shunts none of the signal at this time.

Hence, when the Q lead of the flip flop 72 is switched to a logic 0 level, diode D7 conducts allowing only the Doppler signal related to the microwave frequency F1 to pass through the chopper gates 83 to point B. When the Q lead of flip flop 72 is switched to a logic 1 level, diode D6 conducts, allowing only the Doppler frequency signal related to microwave frequency F2 to pass to point C. The waveforms for the Doppler frequency signals extended to points B and C are designated B and C in FIG. 5. It is seen that in FIG. 5 the signals provided at output points B, D, F, H, J, L, N, P and R as the result of signals conducted over signal channel 25 are drawn in descending order in the upper portion of FIG. 5, and the signals provided at output points C, E, G, I, K, M, O, Q, and S as a result of signals conducted over signal channel 26 are drawn in ascending order in the lower portion of FIG. 5.

The resistors R15 and R16 and capacitor C12 in one half of the Doppler signal separation circuit 23 and resistors R17 and R18 and capacitor C13 in the other half of the Doppler signal separation circuit 23 each form low pass filter networks 84, 85, respectively, which are operable to remove the 25 KHz modulation signal from the Doppler signals. In addition, the filter networks 84, 85 also reduce the magnitude of fluorescent light interference.

The resulting signals extended to the first inputs of the operational amplifiers 81 and 82 are the Doppler signals corresponding to the transmitted frequencies F1 and F2, respectively, with the phase relationship between the two distinct Doppler signals being preserved as can be seen by comparing the wave forms designated B and C in FIG. 5.

The operational amplifier circuits 81 and 82 have second inputs connected over respective resistors R19 and R20 and a common resistor R21 to voltage source V1. Moreover, the second input of operational amplifier 81 is referenced to ground over series RC circuit including a resistor R22 and a capacitor C14 and the second input of operational amplifier 82 is referenced to ground over a further series RC network including a resistor R23 and a capacitor C15. Resistor R22, which is a variable resistor, permits gain matching adjustments for the two amplifier circuits 29 and 32 to provide equivalent amplification for each of the two amplifiers 29 and 32.

The amplifier circuits 29 and 32 each include feedback resistors R24 and R25, respectively, connected between the outputs and the second inputs of the operational amplifiers 81 and 82, respectively. In addition, the first input of operational amplifier 81 is connected over resistors R26 and R27 to ground, and the first input of operational amplifier 82 is connected over resistors R28 and R27 to ground.

The Doppler signals at points B and C are inverted and amplified by amplifiers 29 and 32 respectively, providing the signals indicated at D and E in FIG. 5 at points D and E respectively. The signals provided at points D and E are coupled over separate signal paths to first inputs of individual squaring amplifiers 30 and 33, respectively.

The squaring amplifiers 30 and 33, shown in FIG. 3, each include an operational amplifier 88 and 89, respectively. The operational amplifiers 88 and 89 may each comprise one half of an integrated circuit operational amplifier pair, such as the type SN 72558, commercially available from Texas Instruments. Operational amplifier 88 has a first input coupled over a variable resistor R29 and a capacitor C16 to the output of amplifier 29. The first input of operational amplifier 88 is also connected over resistors R30 and R31 to +V1 potential and over resistor R30 and parallel connected resistor R32 and capacitor C17 to ground. A feedback resistor R33 is connected between the output and the first input of operational amplifier 88.

Similarly, operational amplifier 89 has a first input coupled over a resistor R34 and a capacitor C18 to the output of amplifier 32. The first input of operational amplifier 89 is also connected over resistors R35 and R36 to +V1 potential and over resistor R35 and parallel connected resistor R37 and capacitor C19 to ground. A feedback resistor R38 is connected from the output to the first input of operational amplifier 89.

Operational amplifiers 88 and 89 each have second inputs referenced to ground over adjustable resistance networks including resistors R39, R40 and resistors R41, R42, respectively. The resistors R40, R42 and R29, which are variable resistors, permit gain matching for the two amplifier stages 30 and 33 and establish the turn-on threshold for the two squaring amplifiers 30 and 33.

The squaring amplifiers 30 and 33 are responsive to Doppler frequency signals provided at points D and E, respectively, which exceed the turn-on thresholds of the squaring amplifiers 30 and 33 to produce amplitude limited square wave pulses of uniform amplitude which appear across corresponding output networks, including resistors R43 and R44, serially connected between the signal output of operational amplifier 88 and ground, and resistors R45 and R46 serially connected between the signal output of operational amplifier 89 and ground.

More specifically when the amplitude of the Doppler frequency signal at point D exceeds the turn-on threshold of squaring amplifier 30, the voltage level at point F, which is normally at a logic 1 level as shown at F in FIG. 5, will abruptly switch from a logic 1 level to a logic 0 level and will then return to a logic 1 level when the amplitude of the Doppler frequency signal at point D decreases to a level which is less than the turn-on level of the squaring amplifier 30.

Similarly, squaring amplifier 33 is responsive to Doppler frequency signals at point E which exceed the turn-on threshold of squaring amplifier 33 to provide a negative going pulse at point G (indicated at G in FIG. 5).

The signal outputs of the squaring amplfiers 30 and 33 are extended to individual pulse shaping circuits 31 and 34 in the respective Doppler frequency signal channels 25 and 26, respectively.

Each of the pulse shaping circuits 31 and 34 includes a pair of retriggerable monostable circuits, such as monostable circuits 91 and 92 for pulse shaping circuit 31. The signal output of squaring amplifier 30 at point F is extended over an input gate 93 to the set input of monstable circuit 91. A second input of gate 93 is connected to the output of an inverter 94 which has an input connected to ground. The output of monostable circuit 91 is extended over an inverter 95 and an input gate 96 to the set input of monostable circuit 92.

Similarly, pulse shaping circuit 34 includes a pair of monostable circuits 97 and 98. The signal output of squaring amplifier 33 at point G is extended over an input gate 99 to the set input of monostable circuit 97. The input gate 99 has an input connected to the output of an inverter 100 which has an input connected to ground. The output of monostable circuit 97 is extended over an inverter 101 and an input gate 102 to the set input of monostable circuit 98.

The monostable circuits 91 and 97 which provide enabling pulses for monostable circuits 92 and 98, respectively, serve to prevent multiple triggering of subsequent logic circuits of the phase detector circuits 36 by vestigial modulation signals which are sometimes present on the edges of the output signals provided by the squaring amplifiers 30 and 33. The monostable circuits 92 and 98 serve to produce a pulse output of a duration which is compatible with the triggering requirements of the phase detector circuits 36.

Whenever point F goes to ground, monostable circuit 91 will be enabled providing a negative going pulse at point H which is extended over inverter 95 to enable monostable circuit 92. The duration of the pulse (designated H in FIG. 5) provided by monostable circuit 91 is determined by a timing network, including a resistor R47 and a capacitor C20, associated with monostable circuit 91 and may, for example, be 10 milliseconds.

The monostable circuit 92 is responsive to each pulse extended thereto from point H to provide a negative going pulse at point J, the duration of the pulse (designated J in FIG. 5) being determined by a timing network including a resistor R48 and a capacitor C21 associated with monostable circuit 92. The duration of the pulse provided by monostable 92 may, for example, be 0.5 milliseconds.

In like manner the monostable circuit 97 is enabled to provide a negative going pulse at point I for enabling monostable circuit 98. Monostable circuit 97 has an associated timing network, including resistor R49 and capacitor C22 for determining the duration of the pulse provided at point I, which, for example, may be 10 milliseconds.

The monostable circuit 98 is responsive to each pulse provided at point I to provide a negative going pulse at point K. The duration of the pulse provided at point K may be 0.5 milliseconds and is determined by a timing network, including a resistor R50 and a capacitor C23 associated with monostable circuit 98. The waveforms for the pulses provided at points I and K are shown in FIG. 5.

Comparing the waveforms J and K shown in FIG. 5, it is seen that narrow pulses are provided at points J and K, respectively, which are related in phase to some finits point on the Doppler signals appearing at points D and E.

The pulses provided at points J and K by pulse shaping circuits 31 and 34, respectively, are extended to individual inputs of the phase detector circuit 36. The phase detector circuit 36 comprises a pair of NAND gates 103 and 104 connected to operate as a JK flip flop. NAND gate 103 has a first input connected to the pulse output of monostable circuit 92 at point J and a second input connected to the output of NAND gate 104. NAND gate 104 has a first input connected to the pulse output of monostable circuit 98 at point K and a second input connected to the output of NAND gate 103.

In operation, assuming that the phase detector flip flop 36 is set such that point M is at a logic 0 level and point L is at a logic 1 level, as shown in FIG. 5, then when a pulse is provided at point J, NAND gate 103 drives point M to a logic 1 level causing NAND gate 104 to switch driving point L to logic 0 as indicated in FIG. 5, providing a reset condition for flip flop 36.

The NAND gates 103 and 104 will remain in this state until a pulse occurs at point K at which time the NAND gates 103 and 104 revert to their original state.

As can be seen in FIG. 5, the period for which point L is at a logic 1 level and point M is at a logic 0 level is determined by the magnitude of the phase lead of the Doppler frequency signal (waveform B) corresponding to frequency F1 over the Doppler frequency signal (waveform C) corresponding to frequency F2.

On the other hand, with reference to the timing diagram given in FIG. 5a, it is seen that the voltage at point L will be at a logic 1 level for a shorter time than will the voltage at point M when the Doppler frequency signal (waveform C) corresponding to frequency F2 phase leads the Doppler frequency signal (waveform B) corresponding to frequency F1.

Thus, in either case, the output of the phase detector flip flop 36 will vary in symmetry according to the timing of the pulses provided at points J and K by monostable circuits 92 and 98, respectively. A difference in the phase of the Doppler frequency signals conducted over the two signal channels 25 and 26 will produce an unbalanced output (i.e., unequal set and reset durations) for the flip flop 36. The distance between the intruder and the location of the Doppler radar apparatus is determined by the magnitude of the unbalance while the polarity of the unbalance (i.e., set condition exceeding reset condition or vice versa) indicate the direction of motion of the intruder relative to the Doppler radar apparatus.

The outputs of the phase detector flip flop 36 at points L and M are extended over individual line drivers 106 and 107, respectively, to complementary pulse networks 108 and 109 of the pulse width detector circuits 41 and 42. Line drivers 106 and 107 provide current amplification for the pulses provided at points L and M.

The output of line driver 106 is connected over a resistor R51 to +V2 potential and coupled over a capacitor C24 to the anode of a diode D8 of the pulse width detector circuit 41 at point 110. The cathode of diode D8 is connected to point 113. Point 110 is also connected to ground over a resistor R52. The pulse network 108 including capacitor C24 and resistor R52 is operable to provide a floating DC level at point 110 for outputs of the phase detector flip flop 36 for coupling pulses provided at the positive output 37 of the flip flop 36 and the associated line driver 106 to the diode D8.

In a similar manner, the output of line driver 107 is connected over a resistor R53 to +V2 potential and is coupled over a capacitor C25 to the anode of diode D9 of the pulse width detector circuit 42 at point 111. The cathode of diode D9 is connected to point 115. Point 111 is also connected to ground over a resistor R54. Capacitor C25 and resistor R54 comprise pulse network 109 which serves to couple pulses provided at the negative output 38 of the phase detector flip flop 36 and associated line driver 107 to the diode D9 of pulse width detector circuit 42.

The complementary pulse networks 108 and 109 are operable to produce DC levels at points 110 and 111, respectively, which are proportional to the relative widths of the logic 1 and logic 0 level output pulses provided at corresponding outputs of the phase detector flip flop 36. The DC voltages provided at points 110 and 111 selectively control the conductivety of diodes D8 and D9 of the pulse width detector circuits 41 and 42 in a manner to be described hereinafter.

The diodes D8 and D9 are normally reverse biased by positive potentials extended to the cathodes of the diodes D8 and D9 over a bias network 112. The bias network 112 includes a resistor R55 connected between the cathode of diode D8 at point 113 and a wiper 114 of a potentiometer R56. Potentiometer R56 is connected between a source of potential +V2 and ground. A capacitor C26 is connected between the wiper 114 of the potentiometer R56 and ground.

The bias network 112 further includes a resistor R57 which is connected between the cathode of diode D9 at point 115 and the wiper 114 of potentiometer R56.

The potentiometer R56 supplies a positive potential of a preselected value to points 113 and 115 over resistors R55 and R57, respectively, for normally reverse biasing diodes D8 and D9 of the pulse width detector circuits 41 and 42, respectively. By appropriate setting of the wiper 114 of potentiometer R56, any desired pulse width ratio (logic 1 to logic 0), as indicated by the amplitude of the DC pulse provided at either point 110 or 111, can be preselected to effect forward biasing of a respective diode D8 or D9 of the pulse width detector circuits 41 and 42.

To illustrate the operation of the pulse width detector circuits 41 and 42, it is assumed that Doppler frequency signals are being produced as the result of an intruder moving in a direction towards the location of the Doppler radar apparatus 10, and accordingly, that the waveforms for the pulses provided at points L and M are as shown in FIG. 5 at L and M, respectively.

After current amplification by line drivers 106 and 107, the logic 1 and logic 0 level pulses provided at points L and M are coupled through capacitors C24 and C25 to the anodes of diodes D8 and D9, respectively. The capacitors C24 and C25 are small enough in value such that considerable pulse differentiation takes place at the frequencies involved. The logic 0 pulse provided at point L and the logic 1 pulse provided at point M, as extended to points 110 and 111, are little affected by capacitors C24 and C25. On the other hand, the logic 1 pulse at L and the logic 0 pulse at M, as extended to points 110 and 111 will exhibit considerable decay.

For a series of pairs of Doppler frequency signals corresponding to the two transmitted frequencies F1 and F2 a series of pulses will be provided at the positive output 37 (point L) of the phase detecting flip flop 36, and a complementary series of pulses will be provided at the negative output 38 (point M) of the phase detecting flip flop 36. At point L, the duration of the logic 1 level pulse will be much greater than the duration of the logic 0 level pulse as shown in FIG. 5 at L, and at point M, the duration of the logic 0 level pulse will be much greater that the duration of the logic 1 level pulse as shown in FIG. 5 at M.

As the logic 1 level pulse of a given series of pulses provided at point L is passed through capacitor C24 to point 110, the potential at point 110 will first rise from zero potential, for example, to a positive value and will then decay to approximately zero volts. When the short duration logic 0 level pulse is provided at point L and coupled through capacitor C24 to point 110, point 110 will be driven to a negative potential. However, since the logic 0 pulse is of a short duration, the potential at point 110 will not rise to zero before the next logic 1 level pulse is provided at point L. Accordingly, when this further logic 1 level pulse is coupled through capacitor C24 to point 110, point 110, which will be at a negative potential, will be driven to a positive value that is less than the value obtained in response to the first logic level pulse. Thus, in the present example wherein the duration of logic 1 level pulses provided at point L is much greater than the duration of logic 0 level pulses provided at point L, the potential at point 110 will not rise to a positive value sufficient to effect forward biasing of diode D8.

The series of pulses provided at point M are of a complementary duty cycle relative to the pulses provided at point L. Accordingly, the opposite effect occurs at point 111 whereat due to the narrow width of the logic 1 level pulses relative to the logic 0 level pulses, point 111 is driven more positive with each successive logic 1 level pulse, causing diode D9 to be rendered conductive.

As indicated above, a reverse bias is supplied to diodes D8 and D9 by bias network 112, including potentiometer R56 and resistors R55 and R57. The reverse bias, which may be +3 volts, is extended to the cathodes of diodes D8 and D9. Such bias level will require a certain duty cycle range (ratio of logic 1 to logic 0) for the pulses at point L before diode D8 becomes forward biased, to pass pulses to point 113, and similarly at point M before diode D9 becomes forward biased to pass pulses to point 115. Either diode D8 or diode D9 will become forward biased to pass pulses to point 113 or 115. However, pulses will not be passed to points 113 and 115 simultaneously (assuming the pulses are phase shift generated).

In the present example, the pulses provided at point M will render diode D9 conductive while diode D8 will remain non-conductive. Accordingly, when point 111 is driven sufficiently positive by the narrow logic 1 level pulses provided at point M, further logic 1 level pulses at point M will pass through diode D9 to point 115 providing the train of pulses shown at O in FIG. 5. However, point 113 will remain at the DC reverse bias level as shown at N in FIG. 5.

Points 113 and 115 are coupled over capacitors C27 and C28, respectively, to the inputs of respective amplifiers 116 and 117.

The amplifier 116 includes a transistor Q6 having a base coupled over capacitor C27 to point 113 and connected over reverse connected diode D10 to ground. The collector of transistor Q6 is connected over a resistor R60 to a source of potential +V2, and the emitter of transistor Q6 is connected to ground. The collector of transistor Q6 is further connected to an input of a decade counter 118 at point P.

Similarly, amplifier stage 117 comprises a transistor Q7 having a base coupled over capacitor C28 to point 115 and connected over reverse connected diode D11 to ground. The collector of transistor Q7 is connected over a resistor R61 to a source of potential +V2, and the emitter of transistor Q7 is connected to ground. The collector of transistor Q7 is further connected to an input of a decade counter 119 at point Q.

Each decade counter 118, 119 is operable to provide a logic 1 level output responsive to a predetermined number of successive pulses extended to the input thereof. In an exemplary embodiment, each of the decade counters 118, 119 is responsive to sixteen successive pulses to provide a logic 1 level output. Thus, for example, assuming a plurality of successive Doppler signals conducted over Doppler signal processing channel 25 phase lead corresponding Doppler signal being conducted over Doppler signal processing channel 26, then decade counter 119 will be stepped to a count corresponding to the number of pulses extended thereto. Whenever the 16 successive pulses are counted by the decade counter 119, the counter 119 provides an output at point S for enabling an associated alarm indicating apparatus 44.

The alarm indicating apparatus is embodied as a light emitting diode D13, which is connected between the output of the decade counter 119 at point S and ground. Decade counter 118 also has an associated alarm indicating apparatus 43 embodied as a light emitting diode D12 which is connected between the output of the counter 118 at point R and ground.

Light emitting diode D13 will be energized to indicate that an intruder is moving in a direction towards the location of the Doppler radar apparatus 10 whenever a predetermined number of successive Doppler signals conducted over signal processing channel 25 phase lead the corresponding Doppler signals conducted over signal processing channel 26. On the other hand, light emitting diode D12 will be energized to indicate that an intruder is moving in a direction away from the location of the Doppler radar apparatus 10 whenever a predetermined number of successive Doppler signals conducted over signal channel 26 phase lead the corresponding Doppler signals conducted over signal channel 25.

Returning to the present example, the pulses conducted over diode D9 to point 115 are coupled over capacitor C28 to amplifier 117 which inverts and amplifies the pulses, providing the output pulse train shown at Q in FIG. 5. When 16 successive pulses are provided at point Q, decade counter 119 will have stepped to a count of 16, and accordingly, a logic 1 level output will be provided at point S as shown in FIG. 5.

The logic 1 level provided at point S will energize the light emitting diode D13 associated with decade counter 119, indicating that the intruder is moving in a direction towards the location of the Doppler radar apparatus 10.

It is pointed out that the collector of transistor Q6 of pulse width detector 41 is connected over a gate 120 to a reset input of the decade counter 119 of pulse width detector 42. Similarly, the collector of transistor Q7 of pulse width detector 42 is connected over a gate 121 to a reset input of the decade counter 118 of pulse width detector 41.

Accordingly, any pulses extended over either diode D8 or D9 of one of the pulse detecting circuits 41 and 42, respectively, will be effective to reset the decade counter 119, 118 of the other pulse width detecting circuit 42 or 41. Thus, in the motion detection system 9 of the present invention, a predetermined number of successive pulses produced as the result of a series of phase leading Doppler signals on a given signal processing channel 25 or 26, must be provided before an alarm indication will be provided by one of the alarm indicators 43 or 44. Thus function aids in the exclusion of vibrating motion as an alarm causing action.

In the foregiong illustration of the operation of the intrusion detection circuits 9 described with reference to the timing chart shown in FIG. 5, it was assumed that an intruder was moving in a direction towards the location of the Doppler radar apparatus 10, and that accordingly, the Doppler frequency signals corresponding to transmitted signals at frequency F1 phase led the Doppler frequency signals corresponding to transmitted signals at frequency F2.

FIG. 5a shows the waveforms produced at various points in the intrusion detection circuits 9 when an intruder is moving away from the location of the Doppler radar apparatus 10. Since the operation of the intrusion detection circuits 9 in such case is similar to the operation of the intrusion detection circuits 9 as set forth above, a specific illustration will not be included in the present detailed description.

However, with reference to FIGS. 3 and 5a, it is seen that the output of the phase detector flip flop 36 at point L consists of short duration logic 1 level pulses whereas the output at point M consists of short duration logic 0 level pulses. Accordingly, point 110 will be driven to a positive potential sufficient to forward bias diode D8, permitting pulses to be conducted over diode D8 to point 113 as shown at N in FIG. 5a. Such pulses, after amplification and inversion by amplifier 116, provide the pulse train at point P at the input of decade counter 118. If at least 16 successive pulses are provided at point P, decade counter 118 will provide a logic 1 level output at point R which will energize light emitting diode D12 to thereby indicate the detection of an intruder moving in a direction away from the location of the Doppler radar apparatus 10.

Alternative Embodiments

The motion detection system 9 of the present invention has been described with reference to a preferred embodiment as including Doppler radar apparatus 10 having an oscillator-mixer circuit 11, shown in FIG. 2, which is operable as both a transmitter and receiver for generating microwave signals for radiation into the monitored area and for receiving signals reflected off objects moving within the monitored area. However, a separate transmitter and receiver circuit may be employed to perform the transmitting and receiving functions. Thus, referring to FIG. 4, there is shown an embodiment for a Doppler radar apparatus 10' which includes a transmitter circuit 130, including an oscillator diode D14, for generating microwave signals for radiation into the monitored area and a receiver circuit 131 including a mixer diode D15 for receiving signals reflected off objects moving within the monitored area.

The oscillator diode D14 of the transmitter circuit 130 has an anode connected to ground and a cathode connectable to the output 65 of the constant current source 62 shown in FIG. 2. The transmitter circuit 130 further includes a varactor diode D16 which is connectable to the output of the modulator circuit 17 at the wiper 73 of potentiometer R1. The transmitter circuit 130 functions in a manner similar to oscillator-mixer circuit 11 of FIG. 2 when operable as a transmitter, with the oscillator diode D14 being biased for operation at a predetermined microwave frequency by current from the constant current source 62, and the varactor diode D16 being driven by the modulator circuit 17 to frequency modulate the signal output of the diode D14 to produce microwave signals alternately at first and second microwave frequencies for radiation into the protected area.

The mixer diode D15 of the receiver circuit 131 has an anode connected to ground and a cathode connected over capacitor C2 to the input of the preamplifier circuit 21 shown in FIG. 2. A resistor R64 is connected between the cathode of diode D15 and ground.

The transmitter circuit 130 and the receiver circuit 131 each include associated antennas 132 and 133 respectively, for radiating the microwave frequency signals into the monitored area and for receiving reflected signals, including Doppler frequency signals and signals at the transmitted frequencies. The mixer diode D15 performs the required mixing function to permit separation of the Doppler frequency signals from the transmitted frequencies.

We claim:

1. In a motion detection system for detecting movement of an object within a predetermined area, Doppler radar means for generating frequency signals for radiation into said area to produce Doppler frequency signals whenever the frequency signals radiated into said area are reflected off said object, said Doppler radar means being operable to radiate signals alternately at least at first and second frequencies into said area to thereby produce at least a pair of discrete Doppler frequency signals including first and second Doppler frequency signals having a relative phase relationship which is indicative of the range and direction of movement of said object relative to said Doppler radar means, phase detecting means responsive to said first and second Doppler frequency signal for providing first and second output pulses having a relative pulse width relationship that is indicative of the phase difference between said first and second Doppler signals, and output means including first and second pulse width detecting means responsive to said first and second output pulses, respectively, to enable an output to be provided over said output means that is indicative of the direction of movement of said object relative to said Doppler radar means.

2. A motion detection system as set forth in claim 1 wherein said Doppler radar means includes oscillator-mixer means operable to generate said frequency signals for radiation into said area and for receiving signals reflected back to said Doppler radar means from said area, including reflected signals at said first and second frequencies and said first and second Doppler frequency signals, said oscillator-mixer means being further operable to mix signals at said first and second frequencies with said reflected signals to permit said first and second Doppler frequency signals to be recovered from said reflected signals.

3. A motion detection system as set forth in claim 2 wherein said oscillator-mixer means includes diode means and control means for controlling said diode means to be operable to generate said frequency signals alternately at said first and second frequencies, whereby said first Doppler frequency signals are produced whenever signals at said first frequency are radiated into said area and said second Doppler frequency signals are produced whenever signals at said second frequency are radiated into said area.

4. A motion detection system as set forth in claim 3 wherein said control means includes modulating means for providing first and second modulating signals for said diode means, said modulating means having timing means for enabling signals at said first frequency to be generated for radiation into said area for a time sufficient to permit the first Doppler signals corresponding to radiated signals at said first frequency to be received by said diode means while signals at said first frequency are being generated to thereby enable said first Doppler frequency signals to be recovered from reflected signals, and for thereafter enabling signals at said second frequency to be generated for radiation into said area for a time sufficient to permit the second Doppler frequency signals corresponding to radiated signals at said second frequency to be received by said diode means while signals at said second frequency are being generated to thereby enable said second Doppler signals to be recovered from said reflected signals.

5. A motion detection system as set forth in claim 3 which includes Doppler signal separation means connected to an output of said oscillator-mixer means and controlled by said control means in synchronism with the generation of signals at said first and second frequencies to pass said first Doppler frequency signals to a first input of said phase detecting means and to pass said second Doppler frequency signals to a second input of said phase detecting means.

6. A motion detection system as set forth in claim 1 wherein said Doppler radar means includes oscillator means for generating said frequency signals for radiation into said area and separate mixer means for receiving reflected signals, including signals at said first and second frequencies and Doppler frequency signals, said mixer means being operable to mix said reflected signals with signals at said first and second frequencies to permit said Doppler frequency signals to be recovered from said reflected signals.

7. A motion detection system as set forth in claim 6 wherein said oscillator means includes diode means and modulating means for controlling said diode means to generate said frequency signals alternately at first and second frequencies, whereby said first Doppler frequency signals are produced whenever signals at said first frequency are radiated into said area and said second Doppler frequency signals are produced whenever signals at said second frequency are radiated into said area.

8. A motion detection system as set forth in claim 7 wherein said mixer means includes further diode means for receiving said reflected signals and for mixing said reflected signals with signals at said first and second frequencies coupled from said oscillator means to said further diode means to enable said first and second Doppler frequency signals to be recovered from said reflected signals.

9. A motion detection system as set forth in claim 8 which includes signal separation means connected to an output of said mixer means and controlled by said modulating means to pass said first Doppler frequency signals to a first input of said phase detecting means and to pass said second Doppler frequency signals to a second input of said phase detecting means.

10. In a motion detection system, Doppler radar means for generating frequency signals for radiation into a predetermined area to produce Doppler frequency signals whenever the frequency signals radiated into said area are reflected off an object moving within said area, said Doppler radar means being operable to radiate signals alternately at first and second frequencies into said area to thereby produce at least corresponding first and second discrete Doppler frequency signals having a relative phase relationship which is indicative of at least the direction of movement of said object relative to said Doppler radar means, Doppler signal processing means including phase detecting means having bistable switching means responsive to said first and second Doppler frequency signals to provide first and second pulses at first and second outputs thereof, the width of one of said pulses being greater than the width of the other one of said pulses whenever said first Doppler frequency signal phase leads said second Doppler frequency signal and the width of the other one of said pulses being greater than the width of said one pulse whenever said second Doppler frequency signal phase leads said first Doppler frequency signal, and pulse width detecting means responsive to said first and second pulses to provide a first output indicating that the object is moving in a first direction relative to said Doppler radar means whenever the width of said first pulse exceeds a predetermined value and to provide a second output indicating that the object is moving in the opposite direction whenever the width of said second pulse exceeds said predetermined value.

11. A motion detection system as set forth in claim 10 wherein said bistable switching means includes flip flop means, said flip flop means being set responsive to one of said Doppler frequency signals to provide said first pulse and said flip flop means being reset responsive to the other one of said Doppler frequency signals to provide said second pulse.

12. A motion detection system as set forth in claim 11 wherein said Doppler signal processing means further includes first and second signal circuits responsive to said first and second Doppler frequency signals, respectively, to provide set and reset signals, respectively, for said flip flop means, whereby said flip flop means is first set and thereafter reset whenever said first Doppler frequency signal phase leads said second Doppler frequency signal, and alternatively, said flip flop means is first reset and thereafter set whenever said first Doppler frequency signal phase lags said second Doppler frequency signal.

13. A motion detection system as set forth in claim 12 wherein said first signal circuit includes first amplitude detecting means, responsive to the first Doppler frequency signals which have at least a predetermined amplitude to provide a control signal for effecting the generation of said set pulse and said second signal circuit includes second amplitude detecting means responsive to the second Doppler frequency signals which have at least a predetermined amplitude to provide a further control signal effecting the generation of said reset signal.

14. A motion detection system as set forth in claim 13 wherein said Doppler signal processing means further includes gating means for passing said first Doppler frequency signals to an input of said first signal circuit and for passing said second Doppler frequency signals to an input of said second signal circuit.

15. A motion detection system as set forth in claim 13 wherein said first signal circuit includes first pulse shaping means interposed between said first amplitude detecting means and a set input of said flip flop means and responsive to said control signal to provide said set signal for said flip flop means, and said second signal circuit includes second pulse shaping means interposed between said second amplitude detecting means and a reset input of said flip flop means and responsive to said further control signal to provide said reset signal for said flip flop means.

16. A motion detection system as set forth in claim 10 wherein said pulse width detecting means includes first means connected to said first output of said bistable switching means and enabled to provide said first output whenever the width of said first pulse exceeds a first preselected pulse width value and second means connected to said second output of said bistable switching means and enabled to provide said second output whenever the width of said second pulse exceeds a second preselected pulse width value.

17. A motion detection system as set forth in claim 16 wherein said pulse width detecting means further includes means for controlling said first and second means to preselect said first and second pulse width values.

18. In a motion detection system, Doppler radar means for generating frequency signals for radiation into a predetermined area to effect the generation of Doppler frequency signals whenever the frequency signals radiated into said area are reflected off an object moving within said area, said Doppler radar means being operable to radiate signals of at least first and second frequencies alternately in pairs into said area to thereby produce corresponding pairs of first and second Doppler frequency signals, the Doppler frequency signals of each pair having a phase relationship indicative of at least the direction of motion of said object relative to said Doppler radar means, Doppler signal processing means responsive to each pair of first and second Doppler frequency signals to provide a first output signal whenever the first Doppler frequency signal phase leads the second Doppler frequency signal by a predetermined amount and a second output signal whenever the first Doppler frequency signal phase lags the second Doppler frequency signal by at least said predetermined amount, and output means including first indicator means and first signal counting means responsive to a predetermined number of successive ones of first output signals to enable said first indicator means to provide a first indication whenever said object is moving in a first direction relative to said Doppler radar means, and second indicator means and second signal counting measn responsive to a predetermined number of successive ones of second output signals to enable said second indicator means to provide a second indication whenever said object is moving in the opposite direction.

19. A motion detection system as set forth in claim 18 wherein said output means further includes first reset means responsive to each of said first output signals to effect the reset of said second signal counting means and second reset means responsive to each of said second output signals to effect the reset of said first counting means.

20. In an intrusion alarm system for detecting movement of an intruder within a predetermined area, Doppler radar means for producing a plurality of pairs of first and second discrete Doppler frequency signals, the Doppler frequency signals of each pair having a relative phase relationship indicative of the range and direction of motion of movement of said intruder relative to said Doppler radar means, phase detecting means responsive to each pair of Doppler frequency signals to provide at least one output pulse having a width proportional to the difference in phase between the first and second Doppler frequency signals of a given pair, pulse width detecting means responsive to the output pulse provided by said phase detecting means to provide a first output whenever the first Doppler frequency signal of a given pair phase leads the second Doppler frequency signal of said given pair by at least a predetermined amount and a second output whenever the first Doppler frequency signal of said given pair phase lags the second Doppler frequency signal of said given pair by at least said predetermined amount, and means responsive to a plurality of successive first output signals to provide an alarm indicating that said intruder is moving in a first direction relative to said Doppler radar means and responsive to a plurality of successive second output signals to provide an alarm indicating that said intruder is moving in the opposite direction.

21. In an intrusion alarm system, Doppler radar means including oscillator means having diode means for generating frequency signals for radiation into a predetermined area to effect the generation of Doppler frequency signals whenever the frequency signals radiated into said area are reflected off an intruder moving within said area, and modulating means for controlling said diode means to generate frequency signals alternately at first and second frequencies for radiation into said area to produce corresponding first and second discrete Doppler frequency signals which have a relative phase relationship which is indicative of at least the direction of movement of said intruder relative to said Doppler radar means, said diode means being further operable to receive signals, including said Doppler frequency signals and signals at said first and second frequencies, reflected back to said Doppler radar means and to mix signals at said first and second frequencies with said reflected signals to permit said first and second Doppler frequency signals to be recovered from said reflected signals, phase detecting means responsive to said recovered Doppler frequency signals to provide first and second pulses at first and second outputs thereof, the width of one of said pulses being greater than the width of the other one of said pulses whenever said first Doppler frequency signal phase leads said second Doppler frequency signal and the width of the other one of said pulses being greater than the width of said one pulse whenever said second Doppler frequency signal phase leads said first Doppler frequency signal, and pulse width detecting means including first means responsive to the first and second output pulses provided by said phase detecting means to provide a first output whenever one of said Doppler frequency signals phase leads the other one of said Doppler frequency signals for indicating that the intruder is moving in a first direction relative to said Doppler radar means and a second means for providing a second output whenever said one Doppler frequency signal phase lags said other Doppler frequency signal to indicate that the intruder is moving in the opposite direction.

22. An intrusion alarm system as set forth in claim 21 wherein said diode means comprises avalanche diode means operable to generate signals of a predetermined frequency and wherein said modulating means includes further diode means and timing means for providing control signals for controlling said further diode means to modulate the frequency of the signals provided by said avalanche diode means to thereby permit frequency signals at said first and second frequencies to be generated for radiation into said area.

23. A motion detection system as set forth in claim 22 wherein said further diode means comprises varactor diode means and wherein said timing means comprises control signal generating means for providing first and second control signals at a predetermined rate for controlling said varactor diode means to frequency modulate the frequency output of said avalanche diode means at said predetermined rate.

24. An intrusion alarm system as set forth in claim 23 wherein said control signal generating means includes means for adjusting the rate of generation of said control signals to enable signals at said first frequency to be generated for a time sufficient to permit first Doppler frequency signals corresponding to radiated signals at said first frequency to be received by said avalanche diode means while said signals at said first frequency are being generated to thereby enable said first Doppler frequency signals to be recovered from reflected signals, and to thereafter enable signals at said second frequency to be generated for radiation into said area for a time sufficient to permit said second Doppler frequency signals corresponding to radiated signals at said second frequency to be received by said avalanche diode means while said signals at said second frequency are being generated to thereby enable said second Doppler signals to be recovered from said reflected signals.

25. A motion detection system as set forth in claim 21 which includes Doppler frequency signal separation means connected to an output of said oscillator means and controlled by said modulating means in synchronism with the generation of signals at said first and second frequencies to extend the first Doppler frequency signals corresponding to said first radiated frequency to a first input of said phase detecting means and to extend the second Doppler frequency signals corresponding to said second radiated frequency to a second input of said phase detecting means.

26. A motion detecting system as set forth in claim 21 wherein said diode means of said oscillator means comprises avalanche diode means and wherein said modulating means includes bias means for supplying bias current for said avalanche diode means, said avalanche diode means being responsive to the application of a bias current at a predetermined level to generate frequency signals at a predetermined frequency, said modulating means further including means for controlling said bias means to supply bias current at first and second levels to said avalanche diode means to enable said avalanche diode means to generate frequency signals at asid first and second frequencies.

27. In an intrusion alarm system for detecting movement of an intruder within an area being protected by said system, Doppler radar means for producing a plurality of pairs of Doppler frequency signals, each pair of Doppler frequency signals including first and second discrete Doppler frequency signals which have a relative phase relationship which is indicative of at least the direction of movement of said intruder relative to said Doppler radar means, phase detecting means, signal separation means including first and second signal circuit means and gating means for gating the first Doppler frequency signal of each pair to an input of said first signal circuit means to enable said first signal circuit means to provide a first control signal for said phase detecting means, and for gating the second Doppler frequency signal of each pair to an input of said second signal circuit means to enable said second signal circuit means to provide a second control signal for said phase detecting means, said phase detecting means including flip flop means having a set input connected to an output of said first signal circuit means and a reset input connected to an output of said second signal circuit means, said flip flop means being set by the first control pulses provided by said first signal circuit means to provide a first logic 1 level output at a first output thereof, and a first logic 0 level output pulse at a second output thereof, and said flip flop means being reset by the second control pulses provided by said second signal circuit means to provide a second logic 0 level output pulse at said first output and a second logic 1 level output pulse at said second output, the widths of the logic 1 level output pulses provided at said first and second outputs being indicative of the difference in phase between the first and second Doppler frequency signals of a given pair, and output means responsive to the output pulses provided by said flip flop means to provide a first output whenever the first Doppler frequency signal of a given pair phase leads the second Doppler frequency signals of said given pair by at least a predetermined amount to indicate that the intruder is moving in a first direction relative to said Doppler radar means, and to provide a second output whenever the first Doppler frequency signal of a given pair phase lags the second Doppler frequency signal of said given pair by at least said predetermined amount to indicate that the intruder is moving in the opposite direction.

28. An intrusion alarm system as set forth in claim 27 wherein said first and second signal circuit means include first and second amplitude detecting means, respectively, said first and second amplitude detecting means being responsive to Doppler frequency signals only in excess of a preselected amplitude for enabling said first and second control pulses to be provided over said first and second signal circuit means.

29. An intrusion alarm system as set forth in claim 28 wherein said first signal circuit means further includes first pulse shaping means operable when enabled to provide said first control pulse, and said second signal circuit means further includes second pulse shaping means operable when enabled to provide said second control pulse, said first amplitude detecting means being responsive to each first Doppler frequency signal in excess of said preselected amplitude to provide a signal for enabling said first pulse shaping means, and said second amplitude detecting means being responsive to each second Doppler frequency signal in excess of said preselected amplitude to provide a signal for enabling said second pulse shaping means.

30. An intrusion alarm system as set forth in claim 27 wherein said output means includes first pulse width detecting means enabled whenever at least one of said first logic 1 level output pulses exceeds a predetermined width to provide said first output, and second pulse width detecting means enabled whenever at least one of said second logic 1 level output pulses exceeds a predetermined width to provide said second output.

31. An intrusion alarm system as set forth in claim 30 wherein said first pulse width detecting means includes first circuit means connected to said second output of said flip flop means and said second pulse width detecting means includes second circuit means connected to said first output of said flip flop means whereby said first circuit means is enabled to provide a further output pulse related to the width of said second logic 1 level output pulse and said second circuit means is disabled whenever said first logic 1 level output pulse exceeds said predetermined width, and said second circuit means is enabled to provide a further output pulse related to the width of said first logic 1 level output pulse and said first circuit means is disabled whenever said second logic 1 level output pulse exceeds said predetermined width, and threshold detecting means including first means enabled to provide said first output whenever the amplitude of the further output pulse provided by said first circuit means exceeds a predetermined value and second means enabled to provide said second output whenever the amplitude of the further output pulse provided by said second circuit means exceeds said predetermined value 32. An intrusion alarm system as set forth in claim 31 wherein said threshold detecting means includes means for adjusting the threshold value for said first and second means of said threshold detecting means.

33. An intrusion alarm system as set forth in claim 30 wherein said output means includes alarm indicating means having first counting means connected to an output of said first pulse width detecting means, and second counting means connected to an output of said second pulse width detecting means, said first counting means being enabled responsive to a plurality of successive outputs provided by said first pulse width detecting means to provide a first alarm output and said second counting means being enabled responsive to a plurality of successive outputs provided by said second pulse width detecting means to provide a second alarm output.

34. An intrusion alarm system as set forth in claim 33 wherein said alarm indicating means includes first and second visual indicating means individually energized by said first and second alarm outputs, respectively, to indicate the direction of movement of said intruder relative to said Doppler radar means.

35. An intrusion alarm system as set forth in claim 33 wherein said alarm indicating means includes first reset means connected between the output of said second pulse width detecting means and a reset input of said first counting means for providing a reset signal for said first counting means whenever an output is provided by said second pulse width detecting means and second reset means connected between the output of said first pulse width detecting means and a reset input of said second counting means for providing a reset signal for said second counting means whenever an output is provided by said first pulse width detecting means.

* * * * *